Patented Aug. 8, 1950

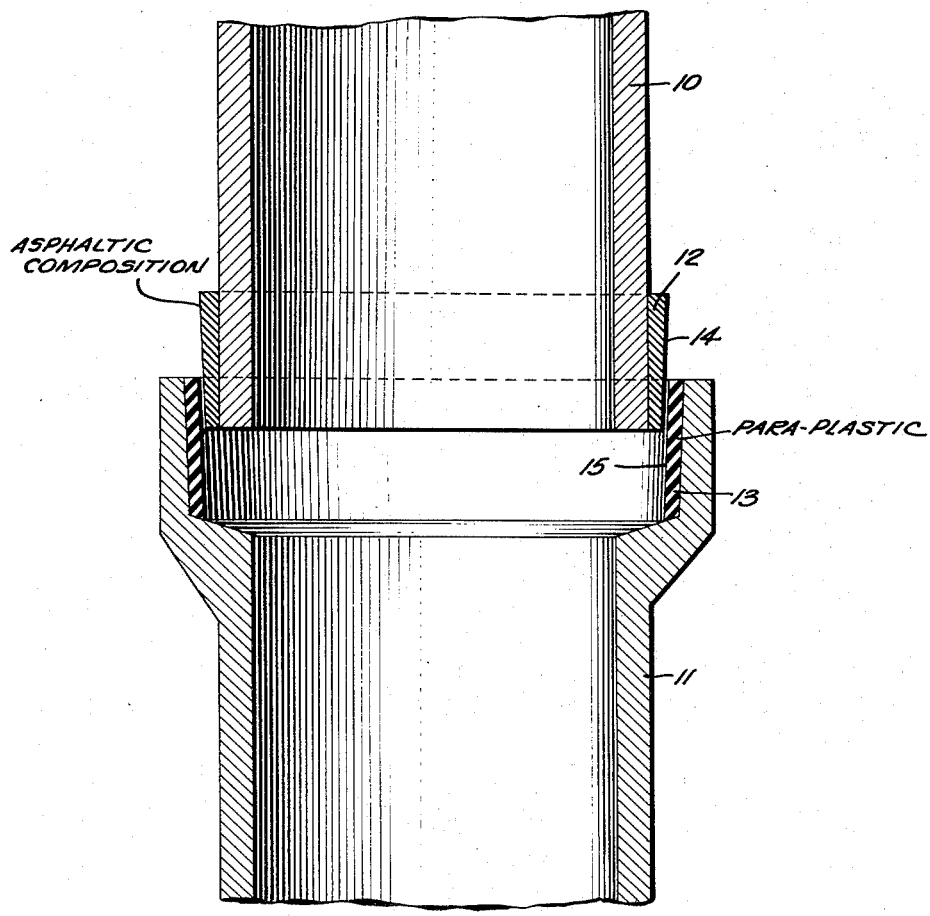

2,517,778

UNITED STATES PATENT OFFICE 2,517,778

SELF-PACKING PIPE JOINT

Albert C. Fischer, Chicago, Ill.

Application May 31, 1945, Serial No. 596,853

1 Claim. (Cl. 285—115)

This invention relates to packings for sealing the joints between pipe sections which, as in the case of bell and spigot joints, for instance, are assembled telescopically; and particularly packings comprising two concentric annular members of plastic material, which are mounted, the one as a lining within the bell, and the other as a facing, upon the spigot, and which, as the pipe sections are brought together, seat telescopically, one within the other, and, by filling the annular space between the overlapping faces of the pipe sections, effect a gas and liquid tight sealing of the joint.

This invention presents an improvement over the joining of pipe sections disclosed in my earlier Patent No. 2,359,755, October 10, 1944, as well as the numerous molding and joining expedients for pipe sections by means of plastic liners dating back to the last century and exemplified in many patents of the prior art.

It is the object of the present invention to simplify the joining operation by molding the internal annular liner on the bell end of the pipe and the external annular liner on the spigot end of the pipe of different plastic compositions of such a nature that sealing contact may be made between them without the need of extraneous solvent or adhesive agents. This objective is attained by the molding of one of the sealing liners, preferably the internal one in the bell end of the pipe section, of a permanently tacky and adhesive plastic composition which enters into effective coalescing relationship with the cooperating sealing liner upon the end of the other pipe section by the mere juncture of the two sealing liners as one is telescoped into adhesive contact with the other.

Other objects and purposes will appear from the following detailed description of the invention taken in conjunction with the accompanying drawing showing in vertical cross-section a preferred embodiment thereof.

In the drawing is shown the lower pipe section 11 having the bell end thereof internally coated with a sealing liner 13 of a rubberized bituminous composition, known in the trade as Para-Plastic material, possessing special properties. This annular liner 13 is adapted to cooperate with the sealing liner 12 of plain asphaltic material upon the external surface of the adjoining pipe section 10. Lateral surface 15 of the bell end liner 13 corresponds to the lateral surface of the spigot end liner 12 so that as the two pipe sections are telescoped one within the other, these surfaces come into close contact and result in a coalescence of the material in the liners 12 and 13.

The liners may be molded in any manner practiced in the prior art, for example, as practiced in my patent mentioned above, No. 2,359,755, or in the Jonhston patent, No. 2,284,741, June 2, 1942, and others.

The essential improvement in the joining of pipes presented herein is in the utilization of different plastic compositions for the two liners in order to eliminate the necessity for the use of solvents, adhesives or rejuvenating agents upon the plastic liners in order to enable them to enter into tight coalescing relationship. The use of the special rubberized bituminous composition for one of the sealing liners is responsible for this simplification. This composition is a tacky adhesive mass having a high degree of distendability and recuperative powers, which properties are not affected by temperatures as low as —10° F.

The rubberized bituminous composition, known in the trade as Para-Plastic material, may be compounded of different ingredients and in different quantities, in dependence upon the specific applications in which the same may be used. These compositions and their modes of compounding are disclosed in detail in copending applications Serial No. 471,503, filed January 6, 1943; No. 575,935, filed February 2, 1945 which has matured into Patent No. 2,511,830, issued June 20, 1950; and No. 583,174, filed March 16, 1945. Examples of such compositions are also disclosed in my prior Patents 2,368,650 dated February 6, 1945, 2,431,384, 2,431,385 and 2,431,386 each dated November 25, 1947, and 2,454,506 dated November 23, 1948.

As disclosed in the first application above, Serial No. 471,503, the composition may consist of about 3½% to 5% of rubber, 35% of a hard brittle asphalt having a melting point of about 170° F. to 180° F., ½% to 1% of a plasticizing agent, about 40% of a soft asphalt having a flow point of about 90° F., 5% to 7% of a mineral filler and 1% to 3% of a flow retarder.

As disclosed in the second application above,

Serial No. 575,935, the composition may have a polymerized linseed oil in lieu of the rubber constituent, and contains the following ingredients in the specific quantities and broad ranges outlined below:

|  | Percent | Percent |
|---|---|---|
| Kempol #54 | 32.6 | (26 to 35) |
| Trumbull asphalt B | 38.0 | (35 to 45) |
| Servicised flux (residual asphalt oil) | 21.6 | (16 to 25) |
| Clay | 4.0 | (3 to 5) |
| Asbestos | 1.1 | (0.5 to 1.5) |
| Zonolite (exfoliated mica) | 2.7 | (1.5 to 3.5) |

In the last mentioned application above, Serial No. 583,174, the composition is disclosed as composed of the following ingredients:

|  | Percent | Percent |
|---|---|---|
| Reclaimed rubber | 17.5 | (12 to 20.0) |
| Flux oil | 3.8 | (1 to 10.0) |
| Cumar | 1.5 | (1 to 5.0) |
| G. R. S. | 4.7 | (2 to 10.0) |
| Oil (S. V. superior base) | 20.0 | (13 to 23.0) |
| Resin | 7.5 | (2 to 12.0) |
| Asphalt | 45.0 | (40 to 50.0) |

The above composition may be poured hot to form the liners as shown in the patents above, or in any other different ways. Any type of asphaltic composition known in the trade as hard asphalts may be poured hot to form the sealing liners 12. While it is preferable that the Para-Plastic composition be poured into the bell end of the pipe section in view of the protection afforded by the internal space in the bell end, it is possible to form the Para-Plastic liner on the spigot end of the pipe section, but in such cases some extraneous form of protection would be desirable, and for this reason it is not as preferable as the arrangement shown in the drawing.

The ingredients of the Para-Plastic composition are such as to maintain the same in a tacky and adhesive state and which react upon the hard asphaltic composition 12 following the juncture of the two so that shortly thereafter a tight coalescent joint between the sealing liners is attained.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claim.

I claim:

In a pipe joint between the bell end of one pipe and the spigot end of an adjoining pipe, sealing elements comprising an annular liner of rubberized bituminous composition of normally tacky and adhesive characteristics upon one pipe end and an annular liner of normally non-tacky bituminous material upon the other pipe end capable of blending with said tacky composition on pressure contact therewith to form the seal, said liners merging into coalescing relationship upon the telescoping of one end relative to the other one.

ALBERT C. FISCHER.

REFERENCES CITED

The following references are of record in the file of this patent:

UNITED STATES PATENTS

| Number | Name | Date |
|---|---|---|
| 157,356 | Stanford | Dec. 1, 1874 |
| 1,881,438 | Fischer | Oct. 11, 1932 |
| 1,979,470 | Johnston | Nov. 6, 1934 |
| 2,162,687 | Fischer | June 13, 1939 |
| 2,285,046 | Murdock | June 2, 1942 |